Dec. 12, 1967  E. W. GEIGEL  3,357,152
CORNER CUT THERMOPLASTIC BAG
Filed Oct. 21, 1963  4 Sheets-Sheet 1
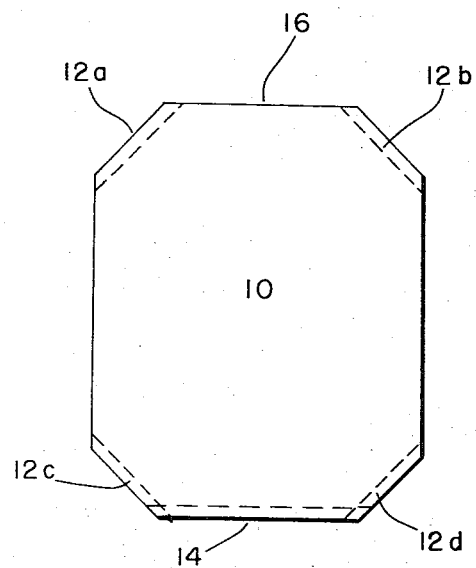
Fig I
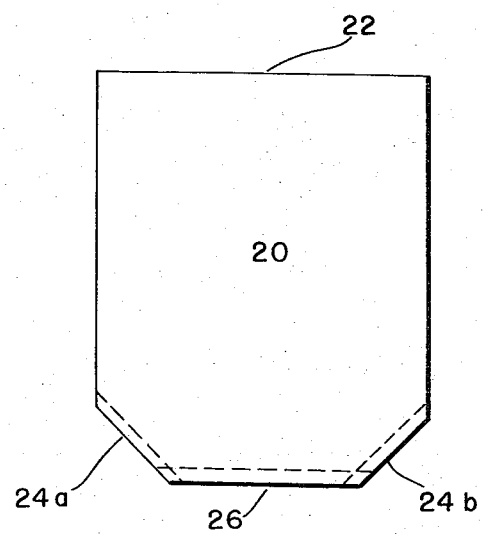
Fig II
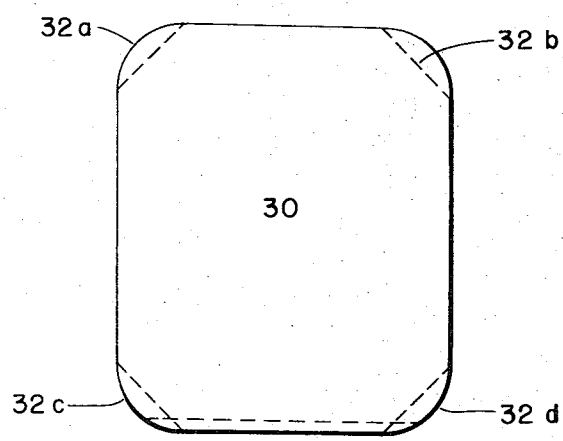
Fig III
EUGENE W. GEIGEL INVENTOR.
BY James C. Joyamaimi

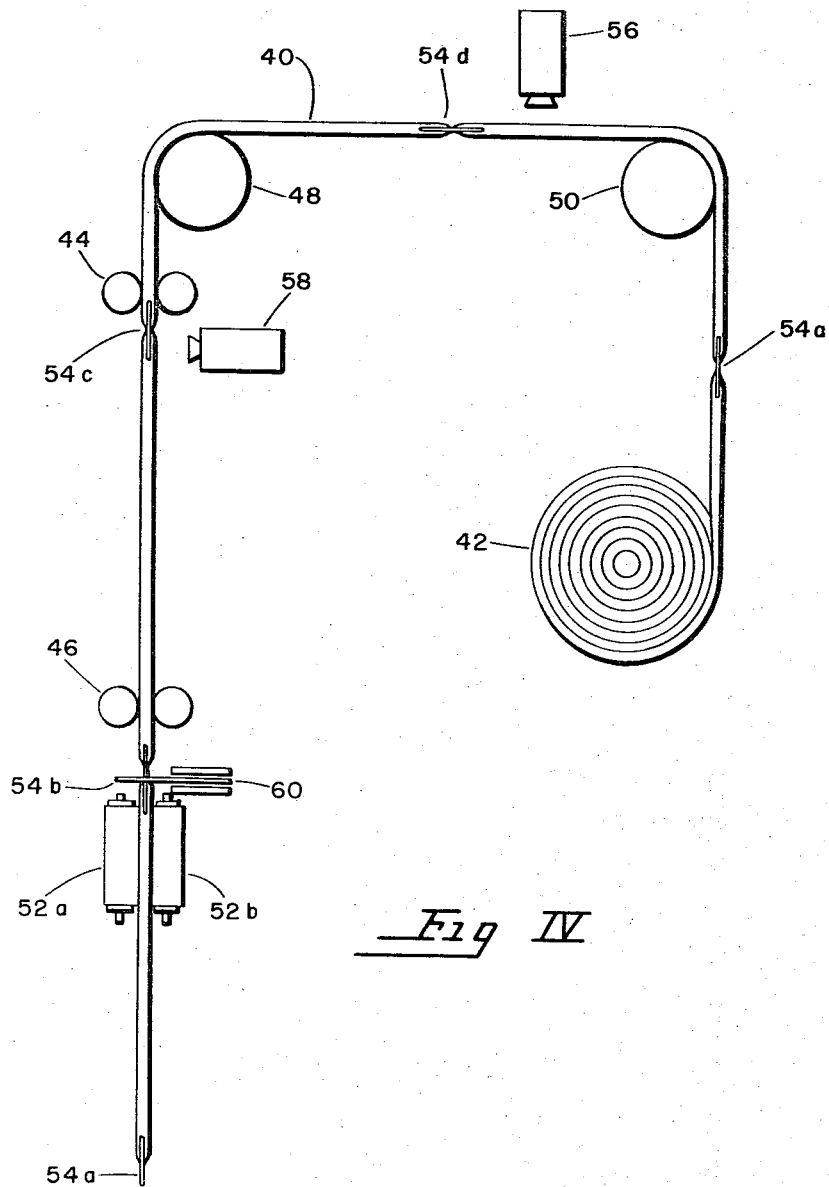
Fig IV

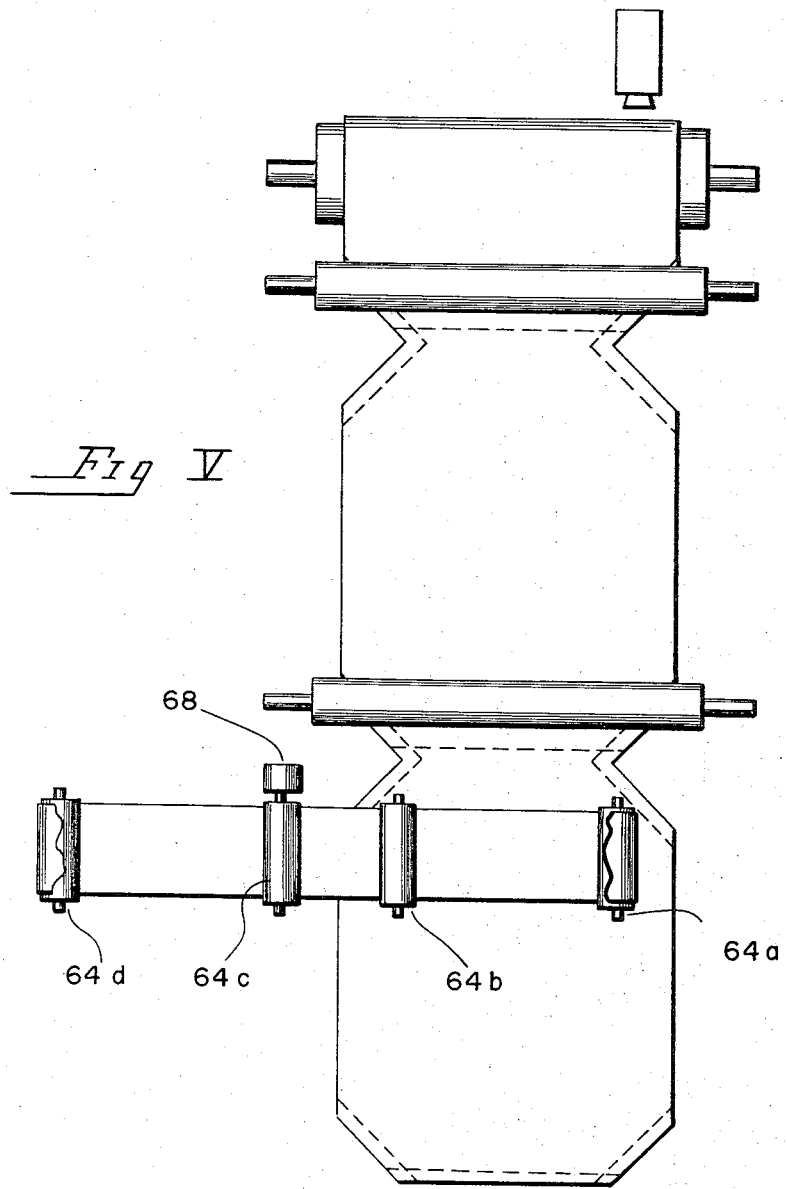

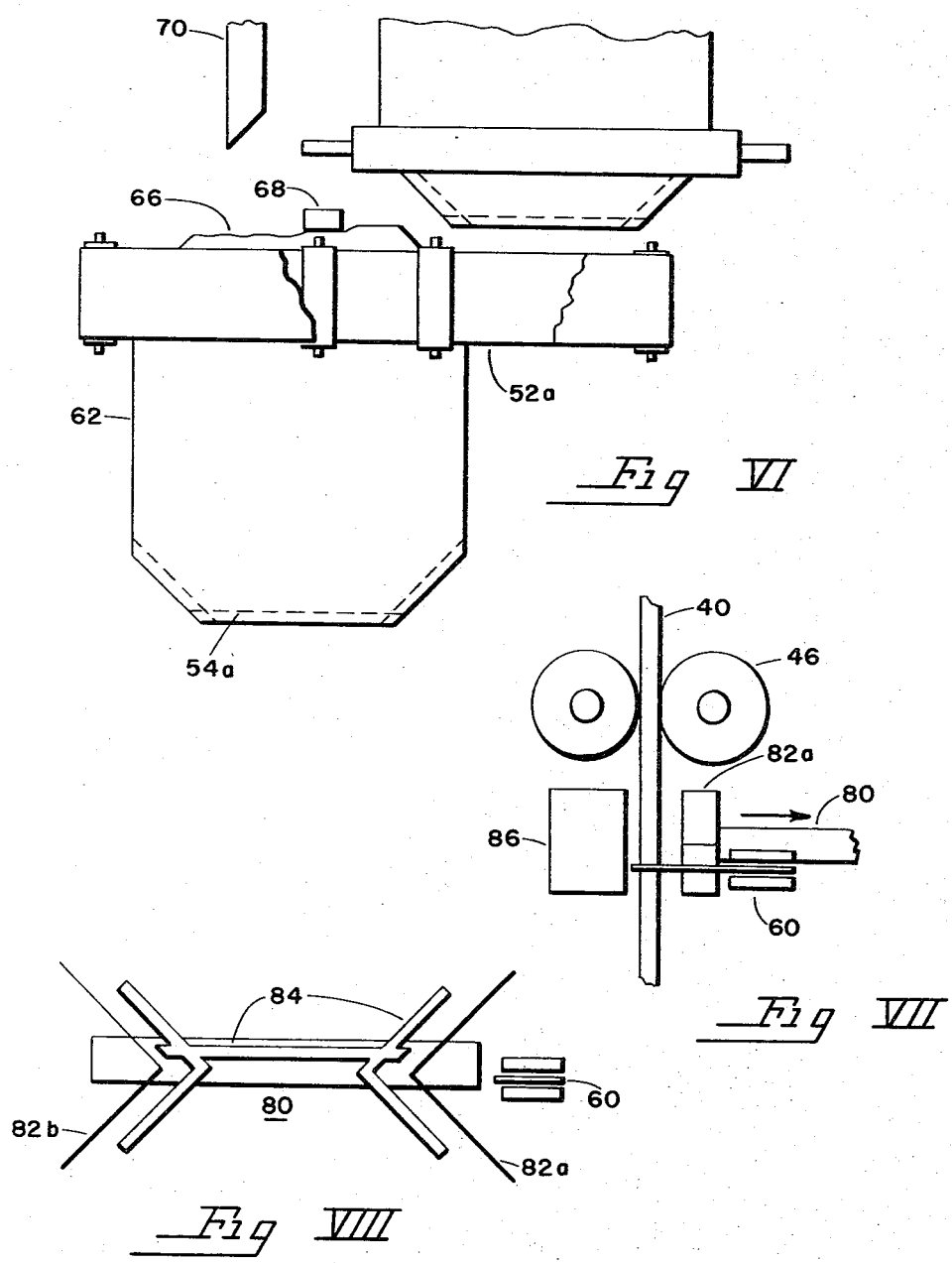

United States Patent Office 3,357,152
Patented Dec. 12, 1967

3,357,152
CORNER CUT THERMOPLASTIC BAG
Eugene W. Geigel, Springfield, Mass., assignor to Monsanto Company, a corporation of Delaware
Filed Oct. 21, 1963, Ser. No. 317,572
4 Claims. (Cl. 53—29)

The present invention relates to novel thermoplastic bags and to methods for preparing same. More specifically, this invention relates to novel bags and methods by which they may be made and packaged.

In a copending application S.N. 267,978, filed March 26, 1963, now Patent No. 3,264,794, a bag forming and packaging apparatus is described which utilizes a continuous tube of thermoplastic material. More specifically, a bagging machine simultaneously forms bags from a continuous tube of thermoplastic material and fills the same with the material to be packaged. This apparatus overcame serious problems which arose when more flexible thermoplastic materials were used as packaging materials in place of more rigid paper products.

In the operation of this bag forming and packaging operation as described in the aforementioned copending application, the bags that are formed are nongusseted and square or rectangular in shape. It has been found that by removing the corner portions of these thermoplastic bags, many unexpected advantages are derived. Corner removal tends to eliminate the tendency to snag, improves stackability and palletization and presents many of the shape advantages of the gusseted bag while at the same time avoiding the more cumbersome procedures of gusseted bag manufacture.

Accordingly, it is a primary object of the present invention to provide novel corner cut thermoplastic bags of substantial volumetric capacity and methods for preparing same.

Another object of this invention is to provide means and methods for packaging materials in a manner such as described in copending patent application S.N. 267,978, filed March 26, 1963.

Other objects of the present invention will in part be obvious and will in part appear hereinafter.

These and other objects are attained in a thermoplastic bag comprising a tubular body of thermoplastic film that is sealed across its bottom with the four corner portions of said tubular body being fashioned without corner points. Although the stackability feature may be diminished somewhat, the corner points at the top of the bag may be maintained for gripping purposes while the two remaining corner portions at the bottom of the tubular body are fashioned without corner points.

Other objects and advantages of the invention will be apparent from the following detailed description when read in conjunction with the attached drawings in which;

FIG. I is an elevation of the thermoplastic bag of the present invention wherein all corner points have been removed;

FIG. II illustrates an alternate embodiment of the bag shown in FIG. I wherein only the corner portions at the bottom of the bag have been removed;

FIG. III illustrates an alternate embodiment of the bag shown in FIG. I wherein the corner portions have been severed in a circular manner to provide rounded edges;

FIG. IV is a side view, partly in section and with parts broken, illustrating mechanism for feeding and severing a continuous tube of thermoplastic film which has been severed and cut at intervals to permit formation of thermoplastic bags of the present invention;

FIG. V is a front view, partly in section and with parts broken, of the same embodiment shown in FIG. IV;

FIG. VI is a front view, partly in section and with parts broken, of the same embodiment shown in FIG. V except that the thermoplastic tube has been severed forming a bag blank which is in a stage of lateral advancement;

FIG. VII is a fragmentary side view, magnified and with parts broken, illustrating a modified embodiment of the apparatus of FIG. IV wherein the apparatus is adapted to triangularly sever at opposite edges and to heat seal the tube of thermoplastic film at predetermined intervals and;

FIG. VIII is a front view of the triangular cutting and heat sealing element 80 shown in FIG. VII.

Referring to FIG. I, thermoplastic bag 10 represents a general type of bag of the present invention. FIG. I illustrates the preferable bag type wherein all four corners of a bag blank have to be removed to form the bag. The bag is sealed at the corner portions 12a, b, c, and d as well as at the bottom edge 14. The top edge 16 is open for filling purposes. After the bag is filled, the top edge 16 will be sealed by either heat means, tape or other suitable sealing means.

FIG. II illustrates a bag 20 wherein only the two bottom corner points have been removed. Similar to the bag of FIG. I, edge 22 is open for filling purpose while corner portions 24a and 24b as well as bottom edge 26 are sealed by any suitable sealing means.

The bag 30 of FIG. III is similar to the bag 10 of FIG. I in every way except that the corner portions 32a, b, c, and d have been fashioned in a circular manner rather than triangular cut.

FIG. IV schematically shows apparatus for packaging materials in thermoplastic bags utilizing a roll of tubular thermoplastic film which has been triangularly severed at intervals in order to form bags of the present invention. The equipment illustrated in FIGS. IV to VII is similar to that described in copending patent application S.N. 267,978, filed March 26, 1963, except that the tubular film being utilized has been triangular cut at intervals in order to form the bags of the present invention or means have been provided to triangularly sever at opposite edges and to seal the tube at intervals in order to eventually produce bags of the present invention. In brief, a continuous tube of thermoplastic film 40 which has been triangularly severed at intervals is unwound from roll 42 by means of pull rolls 44 and 46 over support rolls 48 and 50, between said pull rolls 44 and 46 to and between clamping belts 52a and 52b. In the embodiment shown in FIGS. IV and V, the tubular film material 40 is shown triangularly cut at opposing edges and transversely sealed such that the layers of the tube are cut and adhered or fused together at predetermined intervals along its length, i.e., 54a, 54b, 54c, etc., as it is unwound from roll 42. In this embodiment, the tubular film 40 was triangularly cut and sealed during a prior separate operation not shown in FIGS. IV and V. As illustrated in FIG. VII and FIG. VIII, it is sometimes desirable to triangularly cut and transversely seal the tubular film after it is unwound from roll 42 in timed conjunction with the later transverse severing operation.

In the embodiment described in the aforementioned copending patent application, color bands were marked at the end of each transverse seal for pick up by electric eyes 56 and 58 for controlling the movement of the tubular film 40 through the apparatus. Although any suitable control means may be used to control the movement of the tubular film through the apparatus, the use of color marks would be unnecessary here since the open areas caused by triangularly severing portions of the tubular film may be detected by an electric eye system in a manner similar to that when color bands are utilized.

In the sequence of operations pull rolls 44 and 46 are revolved to unwind and advance the tubular thermoplastic film 40. In the course of film advancement, a triangular severed portion along the edge of film 40 passes in front of electric eye 56 which detects the open area. Upon detection the electric eye 56 transmits a signal via electric means, not shown, to stop pull rolls 44 and 46 which in turn halt the advance of film 40. Since there is a time interval or lag between the detection and transmission of the signal from the electric eye 56, film 40 will advance a distance beyond electric eye 56 before the film 40 stops. To ensure that this distance remains the same each time the film is halted, a second electric eye 58 is positioned such that one of the severed areas will come to rest in front of its lens. In the event the severed area does not come to rest in front of the electric eye 58, a signal is transmitted calling for either a manual or automatic adjustment of the film position. To optimize control, it is recommended that a slight tension be maintained between pull rolls 44 and 46. During proper operation, the electric eye system will cause the pull rolls to halt the advance of the tubular film 40 such that seal 54b is slightly above knife 60 after which clamping belts 52a and 52b move together clamping the tubular film 40 therebetween. Knife 60 then moves laterally severing the tubular film 40 to form a bag blank 62 sealed at its lower or bottom end by seal 54a. As may be seen in FIG. V and VI, clamp belts 52a and 52b initiate advancement of the now severed tube or bag blank 62 laterally by movement of the belts on rollers 64a, 64b, 64c and 64d which causes the edge or open top 66 of bag blank 62 which projects above belts 52a and 52b to strike projection 68 at its forward corner portion forcing bag top 66 to open or separate its parallel edges first at its forward edge and then across the entire top width of the bag as the bag is forced passed and in contact with projection 68 by belts 52a and 52b. If done properly, projection 68 will cause the bag top 66 to open sufficiently to permit a filling nozzle 70 to enter for filling same, after which the opening or bag top 66 is closed by means of tape or other suitable means not shown. Although the expedient used to open the bag blank appears to be simple, the positioning or relationship between projection 68 and bag top 66 is critical. For example, unless bag top 66 projects between ½ to 1½ inches, depending on the flexibility of the bag, above clamp belts 52a and 52b, the top edge of the bag will not tend to open properly. To further illustrate, if the top edge projects too high above the belts, the flexibility of the thermoplastic film will cause both edges of the bag to be pushed to one side or the other without opening the bag blank. On the other hand, if the bag top does not project sufficiently above belts 52a and 52b, the bag will not open enough to permit the filling spout to enter. When the bag is opened properly by projection 68, filling spout 70 will descend between the parallel edges of the bag blank 62 forcing belt clamps 52a and 52b to part sufficiently to permit filling of the bag blank.

When the bag forming and packaging operation are combined, the tubular thermoplastic film material may be triangularly cut at opposing edges and transversely sealed at intervals along its length before it is unwound, i.e., by the supplier or separate sealing operation, or the thermoplastic film material may be triangularly edge cut and sealed as it is advanced through the apparatus. FIG. VII illustrates a magnified fragmentary portion illustrating an edge cutting and heat sealing mechanism 80 positioned in line partially above the cutting knife 60. The edge cutting and heat sealing mechanism 80 comprises a pair of triangular shaped knives 82a and 82b and a heating element 84 which is designed to fusion seal the triangularly severed portions of the upper and lower bag blanks and the bottom of the upper bag blank. In the sequence of operation, when pull rolls 44 and 46 have halted the advance of film 40, the edge cutting and heat sealing mechanism 80 moves horizontally toward film 40 pressing said film against back bar 86 severing the tube triangularly at the opposite edges. The heating element 84 then fuses the layers of the tubular film 40 together. The construction of the edge cutting and heat sealing mechanism 80 is shown more clearly in FIG. VIII. Positioning the cutting and heat sealing mechanism 80 slightly above knife 60 has the advantage of minimizing control problems by reducing and possibly eliminating the need for the electric eye system which positions the tube 40. However, it is obvious that the cutting and heat sealing mechanism 80 may be located anywhere along the line of advance of the tubular film 40 prior to the knife 60 position or the cutting and heat sealing mechanism 80 and the knife 60 may be constructed in one integral unit.

The invention in its broadest sense comprises forming a thermoplastic bag which comprises a tubular body of thermoplastic film that is sealed across its bottom with at least two of the four corner portions of the tubular body being fashioned without corner points. The formation of these bags may be carried out in conjunction with the packaging operation. More specifically, a continuous tube of thermoplastic film may be triangularly cut at opposite edges and transversely sealed at intervals to form a series of connected bag blanks which are later severed across their length adjacent each seal to provide bag blanks sealed at their bottom end and having their corner points removed. Each bag blank is then transferred to a filling station where it is filled with the materials to be packaged, after which the open end of the bag blank is closed. As mentioned earlier, the thermoplastic tube may be triangularly cut and sealed at any time prior to the tube severing operation either during a separate or remote operation or in timed conjunction with the severing operation. Any suitable method for adhering or fusing the layers of the tube together at the corner portions and across the tube may be used. The width of the adhered or fused line or band may vary considerably although widths of ⅛ to ⅜ of an inch are recommended for good bonding while at the same time utilizing a minimum area of seal. The preferred methods of sealing are those which cause the layers of the tubular film to fuse together. This is generally accomplished by an electric heating element although other means of obtaining the proper fusion temperature may also be used.

When the formation of the bag and the packaging operation are carried out simultaneously, the handling problems caused by stacking the bag blanks and then transferring them to a bagging station are avoided. Any suitable means may be used to sever the bag blank from the continuous tube such as the shuttle type knife described in FIGS. IV and V, a rotary knife, a guillotine type and the like. If desired, the tubing may be pre-perforated adjacent and parallel the seals to permit mechanical separation instead of cutting the tube directly. It is important, however, that the tube be cut or separated parallel the line of seal immediately adjacent the advanced or forward end of the heat seal. In this manner a bag blank will be formed having a sealed lower end and an upper end ready for filling.

The thermoplastic bags of the present invention can be fabricated from such fusion-sealable plastic materials as polyethylene, polystyrene, polyethylene terephthalate, polyvinyl chloride, polyvinyl acetate, polyvinylidene chloride, polyisobutylene, polypropylene, polytetrafluoroethylene and the like and insluding their mixtures, copolymers, terpolymers and graft polymers.

The preferred material of construction is polyethylene, a solid, tough polymer of ethylene which can be manufactured in film-form in thicknesses less than one mil. It is light in weight, extremely low in water absorption and moisture permeability and consequently is an excellent material for packaging uses. In addition, layers of polyethylene can be heat sealed or fused together to present a strong bond.

The thermoplastic bags of this invention ordinarily will have a substantial volumetric capacity, e.g., at least 1 cubic foot, and are designed primarily to carry from about 50 to about 100 pounds of such common pulverulent materials as cement, flour, fertilizer, carbon black, chemicals, and granular materials such as salt, sugar and the like. The walls of the bag ordinarily will have a thickness of the order of 4–15 mils, although obviously the falls may be either thinner or thicker as indicated by the use to which the bags are to be put. If desired, the walls of the bag can be fabricated from a plurality of plies of thin thermoplastic film.

In addition to having many desirable characteristics, the thermoplastic bags of the present invention are greatly improved in terms of stackability and palletization and have many of the shape advantages of a gusseted bag but without the gusset.

The above descriptions and particularly the drawings are set forth for purposes of illustration only. Many variations and modifications thereof will be obvious to those skilled in the art and can be made without departing from the spirit and scope of the invention herein described.

What is claimed is:

1. A method of packaging materials in an improved thermoplastic bag which comprises triangularly cutting at opposite edges, sealing the cut edges and transversely sealing a continuous uniformly flattened tube of thermoplastic film at predetermined intervals along its length, transversely severing the tubular film adjacent each transverse seal to form a bag blank sealed at one end, transferring said bag blank to a filling station and filling said bag blank with the material to be packaged.

2. A method of packaging materials in an improved thermoplastic bag which comprises triangularly cutting at opposite edges and transversely sealing a continuous uniformly flattened tube of thermoplastic film in the same operation at predetermined intervals along its length, transversely severing the tubular film adjacent each seal to form a bag blank sealed at one end, transferring said bag blank to a filling station and filling said bag blank with the material to be packaged.

3. A method as set forth in claim 1 wherein the movement of the thermoplastic tube through the cutting, sealing and filling steps are electronically controlled at the triangular cut portions of the tube.

4. A method as set forth in claim 1 wherein the open areas caused by the triangular cutting operation are passed in front of an electric eye to halt movement of the thermoplastic tube for the cutting and sealing steps.

References Cited
UNITED STATES PATENTS

| 1,944,089 | 1/1934 | Litchfield | 93—35 |
| 2,195,740 | 4/1940 | Salfisberg | 53—28 |
| 2,283,069 | 5/1942 | Knuetter | 229—53 |
| 2,390,071 | 12/1945 | Barnett | 53—28 |
| 2,649,673 | 8/1953 | Bartelt | 53—180 X |
| 2,673,495 | 3/1954 | Hecker et al. | 93—35 |
| 2,800,163 | 7/1957 | Rusch | 93—35 X |
| 2,973,697 | 3/1961 | Lerner | 93—35 X |
| 3,023,679 | 3/1962 | Piazze | 93—35 X |
| 3,053,723 | 9/1962 | Plach et al. | |
| 3,104,797 | 9/1963 | Langenfeld | 229—53 |

ROBERT C. RIORDON, *Primary Examiner.*

FRANK E. BAILEY, *Examiner.*

N. ABRAMS, S. ABEND, *Assistant Examiners.*